United States Patent
Buttolo et al.

(10) Patent No.: US 11,358,510 B1
(45) Date of Patent: Jun. 14, 2022

(54) LIFT ASSEMBLY FOR A DELIVERY VEHICLE

(71) Applicant: Ford Global Technologies, LLC, Dearborn, MI (US)

(72) Inventors: Pietro Buttolo, Dearborn Heights, MI (US); Kurt Michael Lundeen, Wixom, MI (US); Yifan Chen, Ann Arbor, MI (US); John Randolf Vincent, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/194,411

(22) Filed: Mar. 8, 2021

(51) Int. Cl.
| | |
|---|---|
| *B60P 3/00* | (2006.01) |
| *B60P 1/02* | (2006.01) |
| *B65G 1/04* | (2006.01) |
| *B65G 1/137* | (2006.01) |

(52) U.S. Cl.
CPC ............... *B60P 3/007* (2013.01); *B60P 1/02* (2013.01); *B65G 1/0435* (2013.01); *B65G 1/1371* (2013.01); *B65G 2203/0216* (2013.01); *B65G 2203/0233* (2013.01); *B65G 2203/041* (2013.01)

(58) Field of Classification Search
CPC .......... B60P 3/007; B60P 1/02; B65G 1/0435; B65G 1/1371; B65G 2203/0233
See application file for complete search history.

(56) References Cited

U.S. PATENT DOCUMENTS

| | | | | |
|---|---|---|---|---|
| 3,782,565 | A * | 1/1974 | Doran ............... | B65G 1/0435 318/605 |
| 5,836,636 | A * | 11/1998 | Adams ............... | B65D 90/0053 414/679 |
| 9,371,183 | B2 | 6/2016 | Toebes et al. | |
| 9,868,596 | B2 | 1/2018 | Worsley et al. | |
| 9,884,719 | B2 | 2/2018 | Pankratov et al. | |
| 10,377,585 | B2 | 8/2019 | Cyrulik et al. | |
| 10,633,186 | B2 | 4/2020 | Valinsky et al. | |
| 10,710,804 | B2 | 7/2020 | Sullivan et al. | |
| 2006/0245862 | A1 * | 11/2006 | Hansl ............... | B66F 9/141 414/281 |
| 2016/0185526 | A1 | 6/2016 | Lert et al. | |
| 2017/0107056 | A1 | 4/2017 | Kadaba et al. | |
| 2019/0177088 | A1 | 6/2019 | Sullivan et al. | |

FOREIGN PATENT DOCUMENTS

| | | |
|---|---|---|
| JP | 2018502027 A | 1/2018 |
| JP | 2019189461 A | 10/2019 |

* cited by examiner

*Primary Examiner* — Saul Rodriguez
*Assistant Examiner* — Willie Berry, Jr.
(74) *Attorney, Agent, or Firm* — Vichit Chea; Price Heneveld LLP

(57) ABSTRACT

A package lift assembly for a delivery vehicle includes a plurality of rods that define at least one shelf. The package lift assembly further includes upper and lower rails. An alteration assembly is operably coupled to the upper and lower rails. Vertical guides are operably coupled to the alteration assembly. A platform is operably coupled to the vertical guides and include a central receiving member. At least a portion of the plurality of rods are selectively disposed within the central receiving member. A motor assembly is operably coupled to the central receiving member and the vertical guides. The motor assembly and the alteration assembly cooperate to translate the platform along the vertical guides and translate the central receiving member between a retrieval position and a holding position.

16 Claims, 10 Drawing Sheets

LIFT ASSEMBLY FOR A DELIVERY VEHICLE

FIELD OF THE DISCLOSURE

The present disclosure generally relates to a delivery vehicle. More particularly, the present disclosure generally relates to a lift assembly for a delivery vehicle.

BACKGROUND OF THE DISCLOSURE

Delivery vehicles typically store items for delivery on shelves. The driver generally retrieves the items for delivery at various locations. The driver may retrieve the items by entering the rear of the delivery vehicle and manually removing the items from the shelves.

SUMMARY OF THE DISCLOSURE

According to a first aspect of the present disclosure, a delivery vehicle includes shelving units that are disposed within a cargo space of said delivery vehicle. The shelving units include shelves and vehicle supports. A delivery item is disposed on at least one of the shelves and a lift assembly is operably coupled to the shelving units and configured to receive the delivery item. The lift assembly includes upper rails and lower rails each being operably coupled to said delivery vehicle. Vertical guides are operably coupled to the upper and lower rails. An alteration assembly is operably coupled to each of the upper and lower rails and the vertical guides. The alteration assembly translates the vertical guides along the upper and lower rails. A platform is operably coupled to the vertical guides and includes a central receiving member. The central receiving member is operable between a retrieval position and a holding position. A motor assembly is operably coupled to the platform and each of the vertical guides.

Embodiments of the first aspect of the disclosure can include any one or a combination of the following features:
  the shelves include a plurality of rods, wherein the plurality of rods are selectively disposed within the central receiving member in the retrieval position of the platform;
  the platform includes side rails operably coupled to the central receiving member, wherein the central receiving member is configured to translate along the side rails between the retrieval position and the holding position;
  a controller is communicatively coupled to the motor assembly, wherein the controller activates the motor assembly to translate the central receiving member between the retrieval position and the holding position;
  a drive feature is communicatively coupled to the controller;
  a pulley assembly is operably coupled to the drive feature, wherein the drive feature translates the lift assembly between a raised position and a lowered position; and/or
  the controller translates the platform into the raised position when the central receiving member is in the retrieval position, wherein the delivery item is disposed on the central receiving member in the retrieval position.

According to a second aspect of the present disclosure, a package lift system for a vehicle includes shelving units including shelves. Upper and lower rails are proximate to the shelving units. A lift assembly is selectively engaged with the shelving units. The lift assembly includes an alteration assembly that is operably coupled to the upper and lower rails. Vertical guides are operably coupled to the alteration assembly. A platform is operably coupled to the vertical guides and includes a receiving member. The receiving member is operable between a retrieval position and a holding position. A motor assembly is operably coupled to the receiving member. A controller is communicatively coupled to the motor assembly and the alteration assembly and translates the receiving member between the retrieval position and the holding position. The controller includes a global positioning system. A memory storage is communicatively coupled to the controller and includes a delivery database that includes coordinates from the global positioning system and a delivery location of a delivery item.

Embodiments of the second aspect of the disclosure can include any one or a combination of the following features:
  a drive feature is operably coupled to the controller and the lift assembly, wherein the drive feature includes the lift assembly relative to the shelving units;
  the receiving member includes sensors that detect a load on the receiving member, wherein the controller is communicatively coupled to the sensors and activates the drive feature when the sensors detect the load on the receiving member;
  the shelves include a plurality of rods and the receiving member defines a plurality of grooves, wherein the plurality of rods are selectively disposed within the plurality of grooves in the retrieval position of the receiving member;
  an imager is operably coupled to the lift assembly and is communicatively coupled to the controller;
  the imager detects a label of the delivery item and the controller compares the detected label with the delivery location stored in the memory storage;
  the global positioning system of the delivery database is communicatively coupled to a network to receive location information of said vehicle; and/or
  the controller activates the motor assembly of the lift assembly to retrieve the delivery item when the controller determines that the delivery location corresponds to the location information of said vehicle.

According to a third aspect of the present disclosure, a package lift assembly for a delivery vehicle includes a plurality of rods that define at least one shelf. The package lift assembly further includes upper and lower rails. An alteration assembly is operably coupled to the upper and lower rails. Vertical guides are operably coupled to the alteration assembly. A platform is operably coupled to the vertical guides and includes a central receiving member. At least a portion of the plurality of rods are selectively disposed within the central receiving member. A motor assembly is operably coupled to the central receiving member and the vertical guides. The motor assembly and the alteration assembly cooperate to translate the platform along the vertical guides and translate the central receiving member between a retrieval position and a holding position.

Embodiments of the third aspect of the disclosure can include any one or a combination of the following features:
  the central receiving member defines grooves in which the plurality of rods are at least partially and selectively disposed;
  the platform further includes side rails that are operably coupled to the central receiving member, wherein the central receiving member translates along the side rails between the retrieval position and the holding position;

a controller is operably coupled to the alteration assembly and the motor assembly, wherein the controller includes the delivery locations;

the controller activates the alteration assembly to position the platform that is proximate to the shelf, wherein the controller activates the motor assembly to translate the central receiving member from the holding position to the retrieval position;

the alteration assembly includes cables that are operably coupled to the platform, wherein the cables translate the platform between a raised position and a lowered position; and/or the controller activates the alteration assembly to raise the platform when the central receiving member is in the retrieval position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
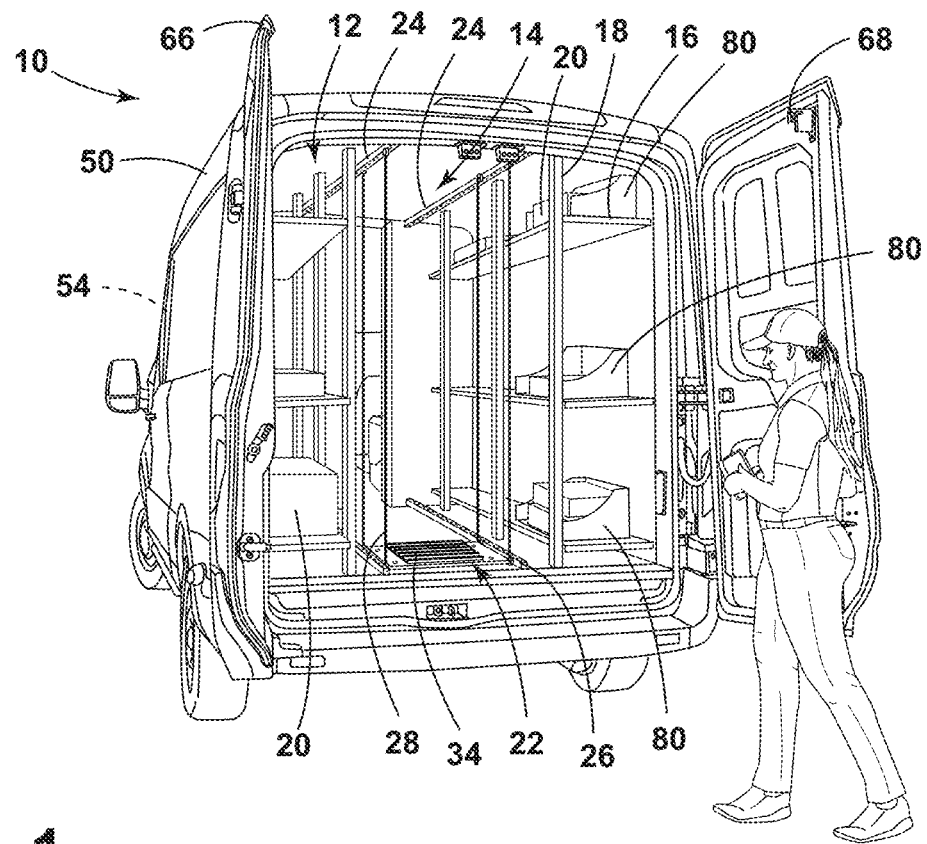
FIG. 1 is a rear perspective view of a delivery vehicle of the present disclosure.
Figure 2:
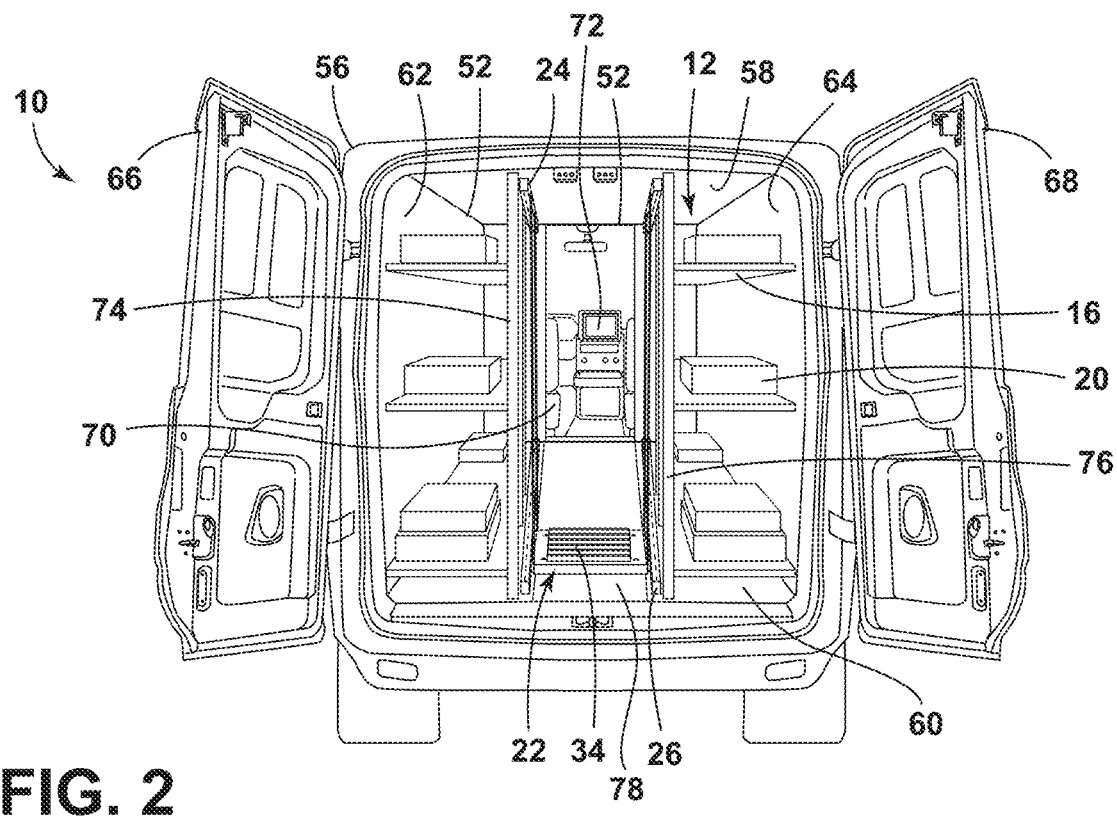
FIG. 2 is a rear elevational view of the delivery vehicle of FIG. 1.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-14, reference number 10 generally refers to a delivery vehicle that includes shelving units 12 disposed within a cargo space 14 of the delivery vehicle 10. The shelving units 12 include shelves 16 and vertical supports 18. A delivery item 20 is disposed on at least one of the shelves 16, and a lift assembly 22 is operably coupled to the shelving units 12. The lift assembly 22 includes upper rails 24 and lower rails 26 that are operably coupled to the delivery vehicle 10. Vertical guides 28 are operably coupled to the upper and lower rails 24, 26, and an alteration assembly 30 is operably coupled to each of the upper and lower rails 24, 26 and the vertical guides 28. The alteration assembly 30 is configured to translate the vertical guides 28 along the upper and lower rails 24, 26. A platform 32 is operably coupled to the vertical guides 28 and includes a central receiving member 34. The central receiving member 34 is operable between a retrieval position 36 and a holding position 38. A motor assembly 40 is operably coupled to the platform 32 and each of the vertical guides 28.

Referring to FIGS. 1-4, the delivery vehicle 10 includes a vehicle body 50 that defines an interior 52 of the delivery vehicle 10. The interior 52 of the delivery vehicle 10 is generally divided between a passenger compartment 54 and the cargo space 14, such that the cargo space 14 is defined toward a rear portion 56 of the delivery vehicle 10. The interior 52 of the delivery vehicle 10 is further defined by a ceiling 58 and a floor 60, in addition to first and second sidewalls 62, 64 of the cargo space 14. The cargo space 14 may be accessible from the passenger compartment 54 via a door and/or an opening. The cargo space 14 may also be accessible via first and second doors 66, 68 coupled to the rear portion 56 of the delivery vehicle 10. The first and second doors 66, 68 provide selective access to the cargo space 14. The cargo space 14 is described in more detail below. The passenger compartment 54 may have at least a driver seat 70 and may also include a user interface 72 with which a driver may interact and receive delivery information, as described further below.

In various examples, the delivery vehicle 10 is a wheeled motor vehicle 10, which may be a sedan, a sport utility vehicle, a truck, a van, a crossover, and/or other styles of vehicle. The delivery vehicle 10 may be a manually operated vehicle (e.g., with a human driver), a fully autonomous vehicle (e.g., no human driver), or a partially autonomous vehicle (e.g., may be operated with or without a human driver).

With further reference to FIGS. 1-4, the cargo space 14 may be divided into first and second sides 74, 76, and the shelving units 12 may be disposed along each of the first and second sides 74, 76. The shelving units 12 are generally configured as multilayer shelves operably coupled to the vertical supports 18 and extending between the ceiling 58 and the floor 60 of the delivery vehicle 10. The vertical supports 18 may be disposed along the first and second sidewalls 62, 64 of the cargo space 14 and/or may be disposed proximate to a central portion 78 of the cargo space 14.

The shelves 16 may be open shelving, such that the shelves 16 extend along a length $L_1$ of the cargo space 14 and may be generally free from obstructions and/or barriers along a length L2 of the shelves 16. Additionally or alternatively, some or all of the shelves 16 may define separate storage compartments 80 in which the delivery item 20 may be disposed. By way of example, not limitation, the delivery item 20 may be a package or other parcel used to protect and conceal a user item during delivery. Each of the separate storage compartments 80 may have an identifier, which may be utilized to assist in the removal of the delivery item(s) 20, as described further below. In either configuration, the lift assembly 22 identifies the delivery item 20 and removes, at least, the delivery item 20 from the shelf 16 via the central receiving member 34, described in more detail below. The shelves 16 are formed from a plurality of rods 82 extending outwardly from a support bar 84 to define each shelf 16. The support bar 84 is operably coupled to the vertical supports 18 to retain the shelves 16 within the cargo space 14. Additionally or alternatively, the support bar 84 of each shelf 16 may be operably coupled to the first and second sidewalls 62, 64 of the delivery vehicle 10 to couple each shelf 16 to the delivery vehicle 10.

Referring still to FIGS. 1-4 and as mentioned above, the upper rails 24 and the lower rails 26 are operably coupled to the delivery vehicle 10 proximate to the shelves 16. The upper rails 24 are operably coupled to the ceiling 58 of the delivery vehicle 10, and the lower rails 26 are operably coupled to the floor 60 of the delivery vehicle 10. It is generally contemplated that the upper and lower rails 24, 26 may each include two rails. Each of the upper and lower rails 24, 26 are disposed proximate to the shelving units 12 on the first and second sides 74, 76 of the cargo space 14. The alteration assembly 30 of the lift assembly 22 is operably coupled to each of the upper and lower rails 24, 26 and is configured to translate the lift assembly 22 along each of the upper and lower rails 24, 26.

The alteration assembly 30 includes a plurality of wheels 90, a housing 92, and a pulley assembly 94. The plurality of wheels 90 are operably coupled to and at least partially disposed within the housing 92. The housing 92 is operably coupled to the vertical guides 28, and the pulley assembly 94 can be partially disposed within the housing 92 and operably coupled to the platform 32. The alteration assembly 30 is operably coupled to at least two of the vertical guides 28. It is generally contemplated that the pulley assembly 94 is operably coupled to at least one of the alteration assemblies 30. As described herein, the alteration assembly 30 and the pulley assembly 94 are described as singular assemblies, but the lift assembly 22 may, and typically does, include a plurality of alteration and pulley assemblies 30, 94.

Figure 3:
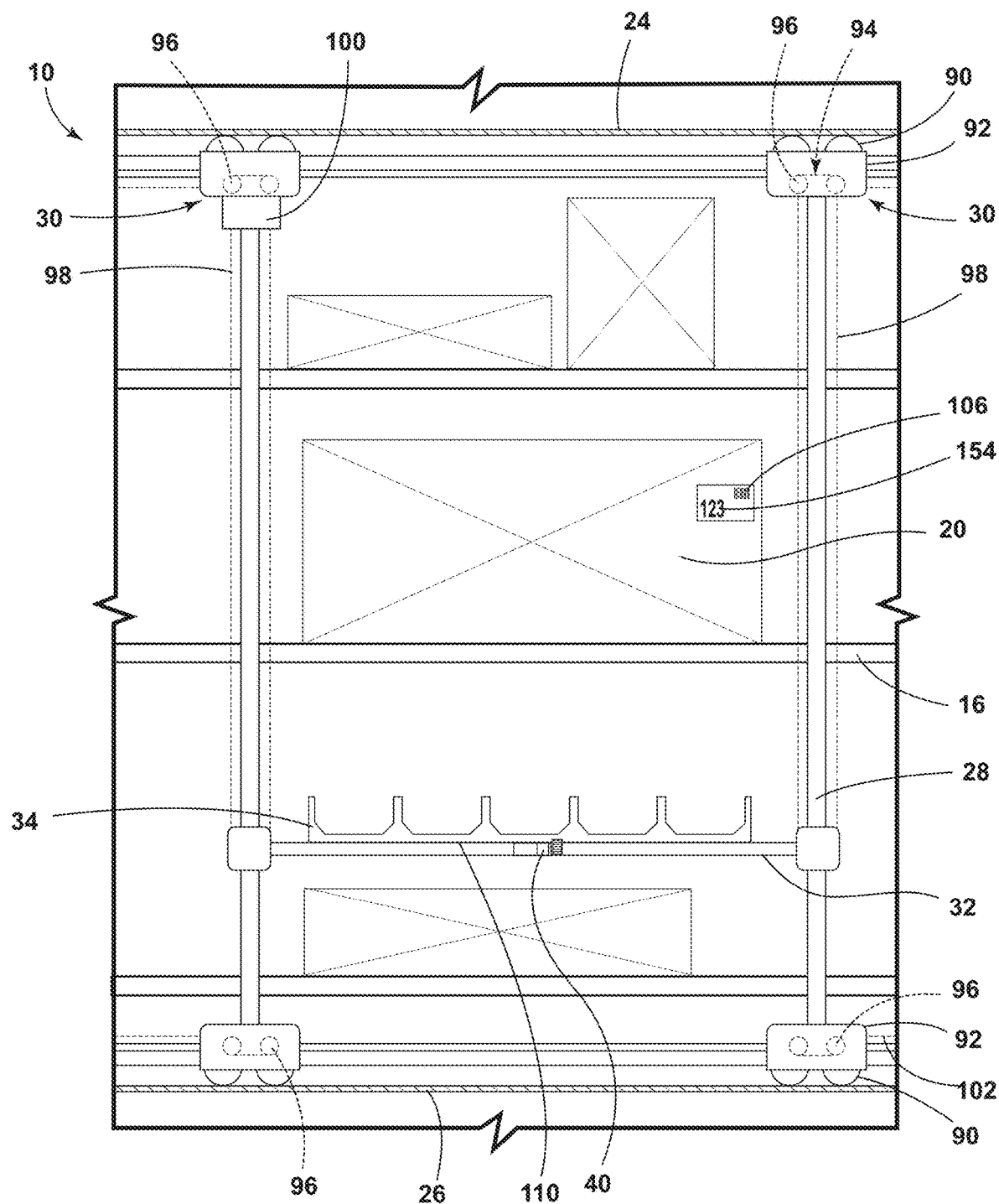
FIG. 3 is an enlarged partial side view of a lift assembly of the present disclosure.
Figure 4:
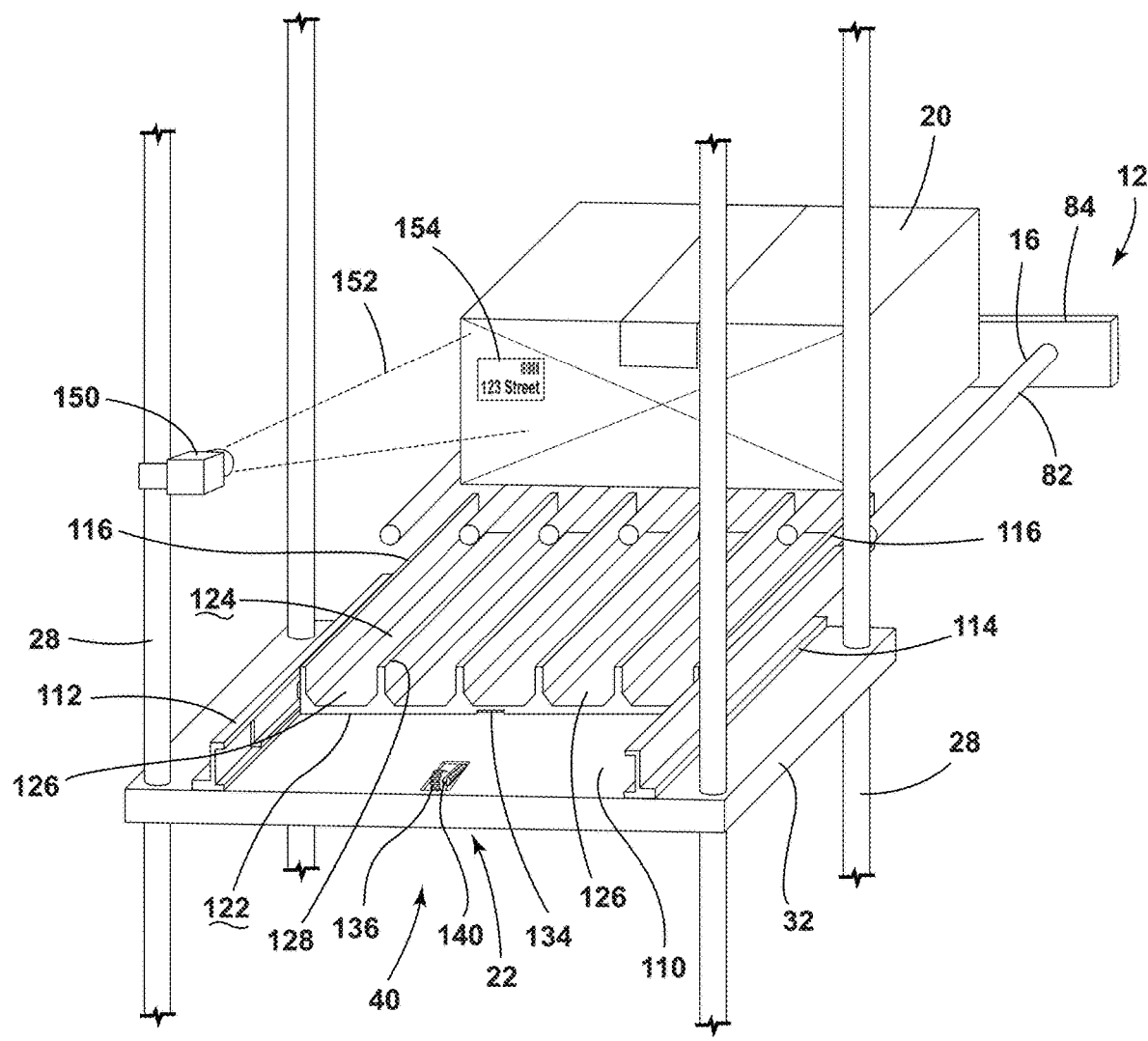
FIG. 4 is a partial side perspective view of a lift assembly of the present disclosure with a receiving member in a retrieval position.
Figure 5:
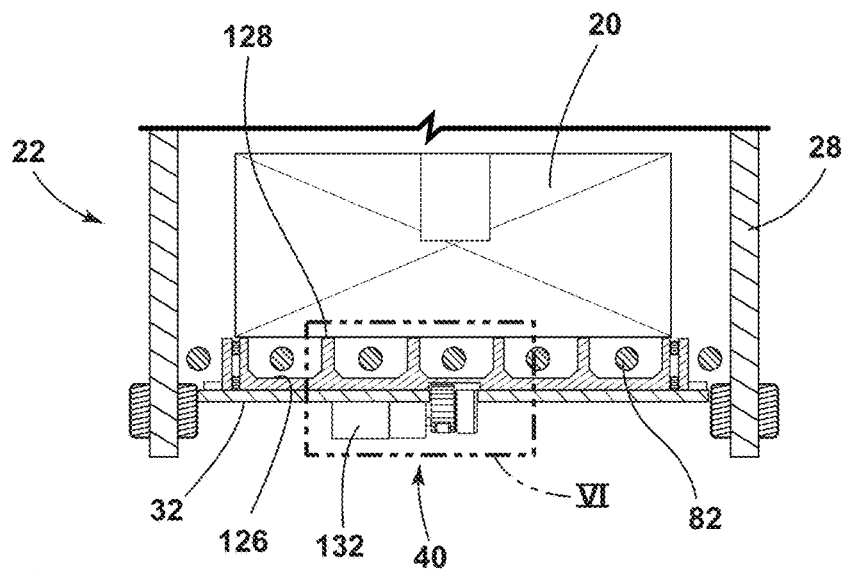
FIG. 5 is partial side elevational view of the lift assembly of FIG. 4 in a raised position with a delivery item on support ridges of the receiving member.
Figure 6:
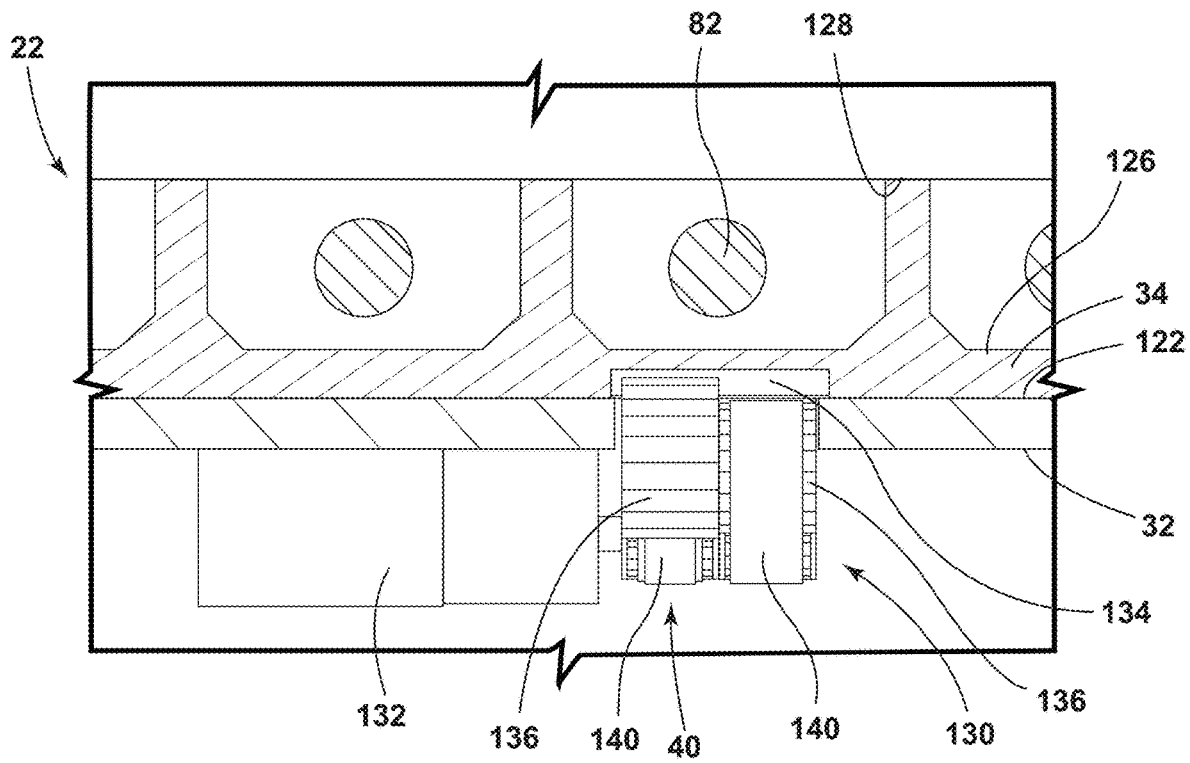
FIG. 6 is an enlarged partial side elevational view of a motor assembly of the lift assembly of FIG. 5.
Figure 7:
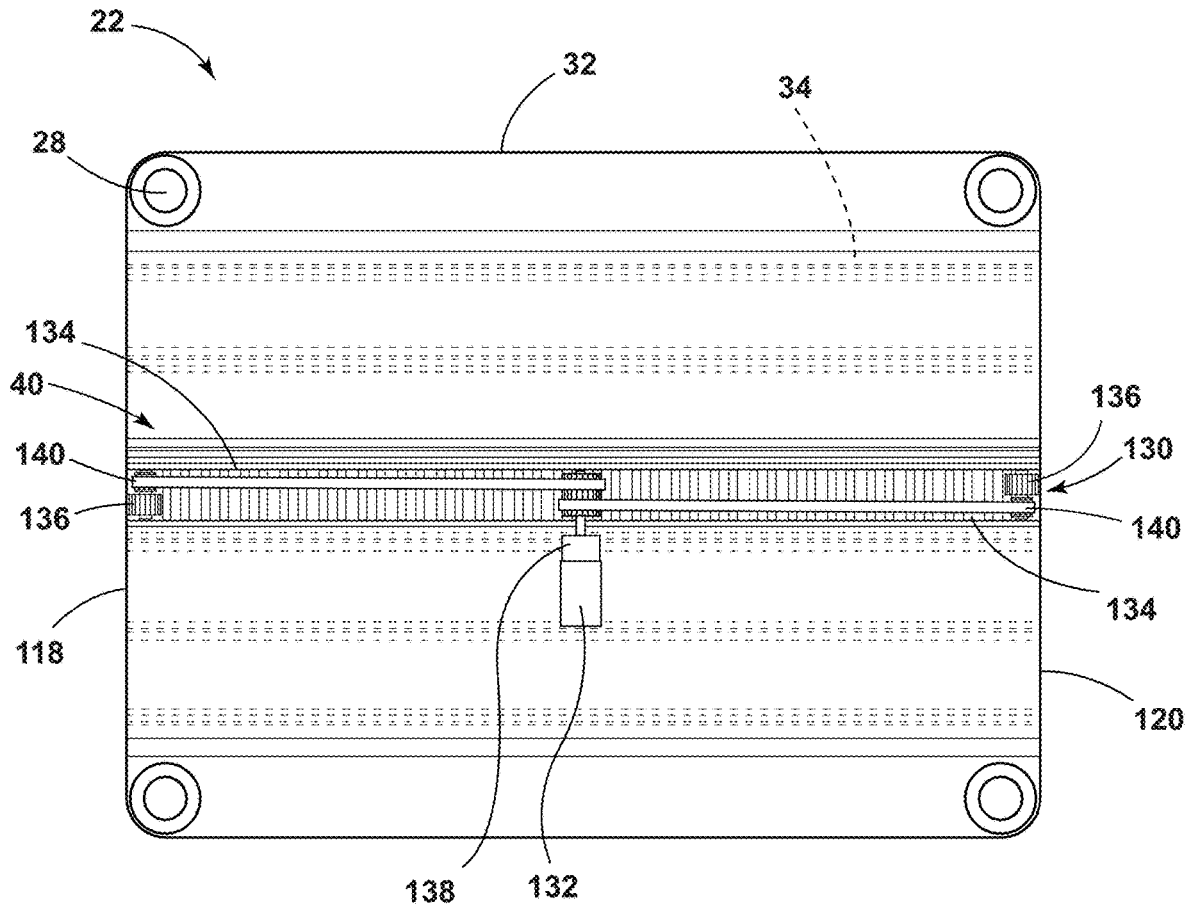
FIG. 7 is a top plan view of the motor assembly of the lift assembly of FIG. 5 with the receiving member in phantom.
Figure 8:
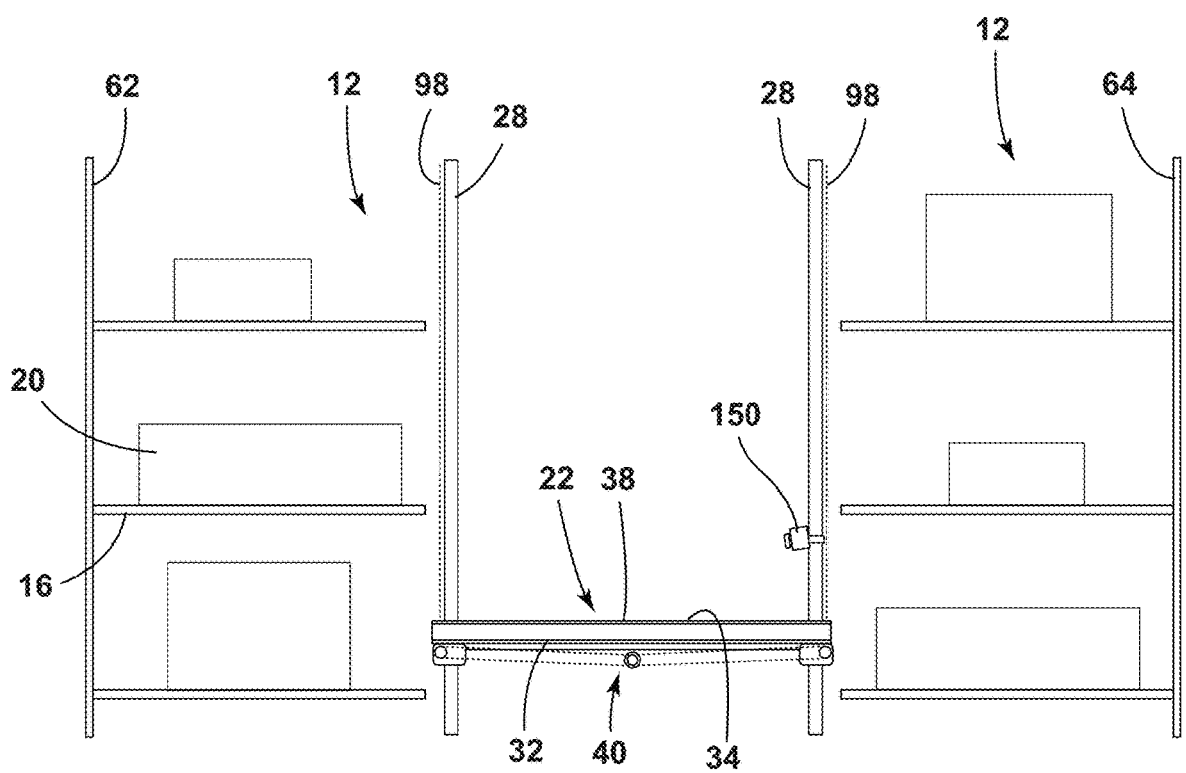
FIG. 8 is a schematic view of a lift assembly of the present disclosure in a lowered position and with a receiving member in a holding position.
Figure 9:
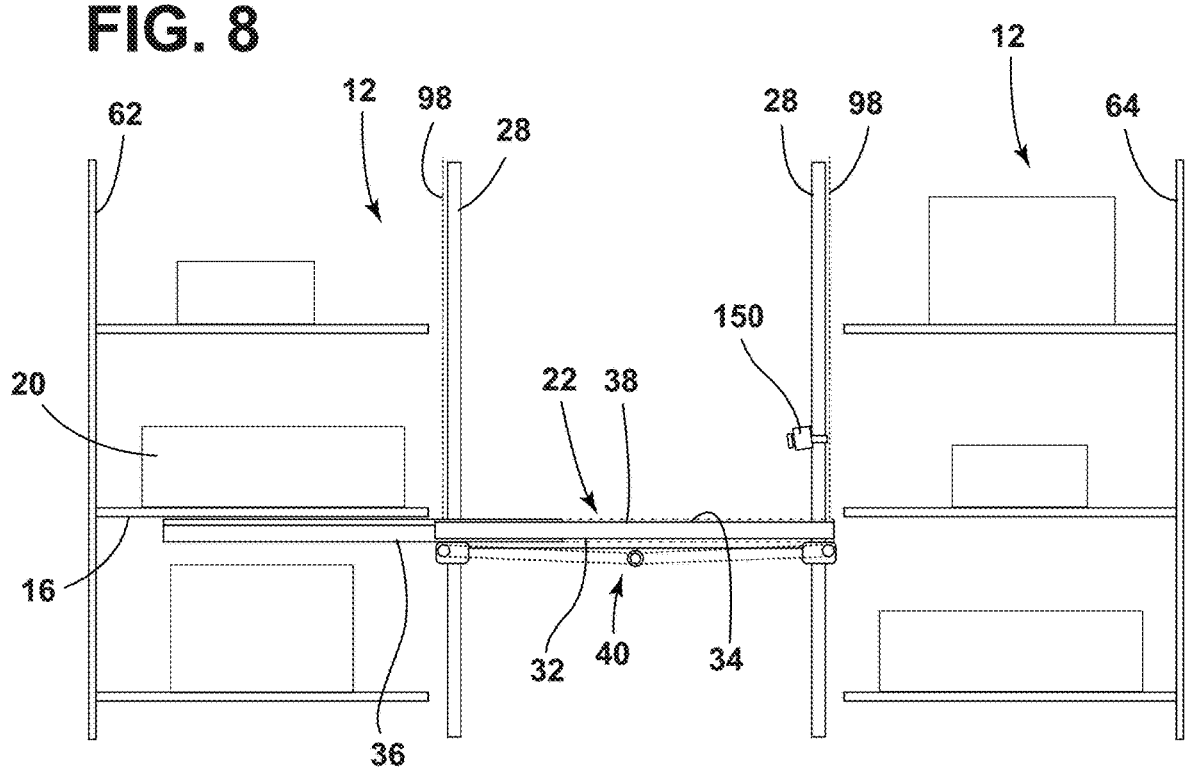
FIG. 9 is a schematic view of the lift assembly of FIG. 8 with a receiving member in a retrieval position.
Figure 10:
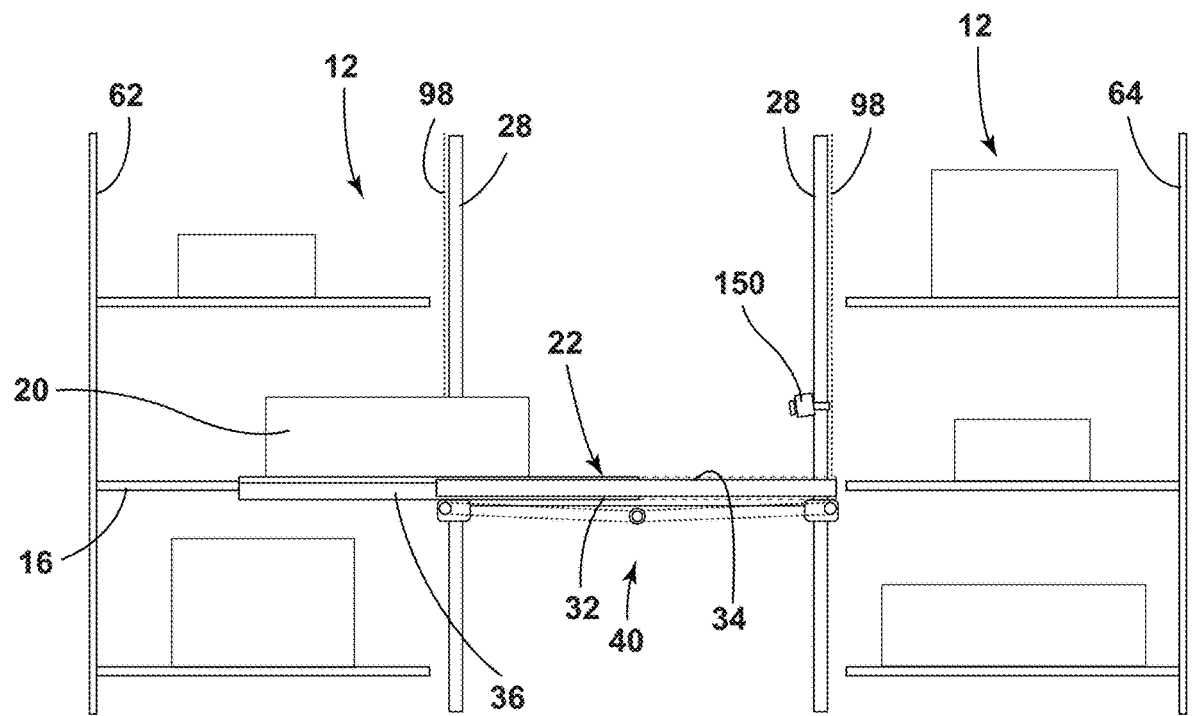
FIG. 10 is a schematic view of the lift assembly of FIG. 8 with a delivery item positioned on the receiving member and the lift assembly in a raised position.
Figure 11:
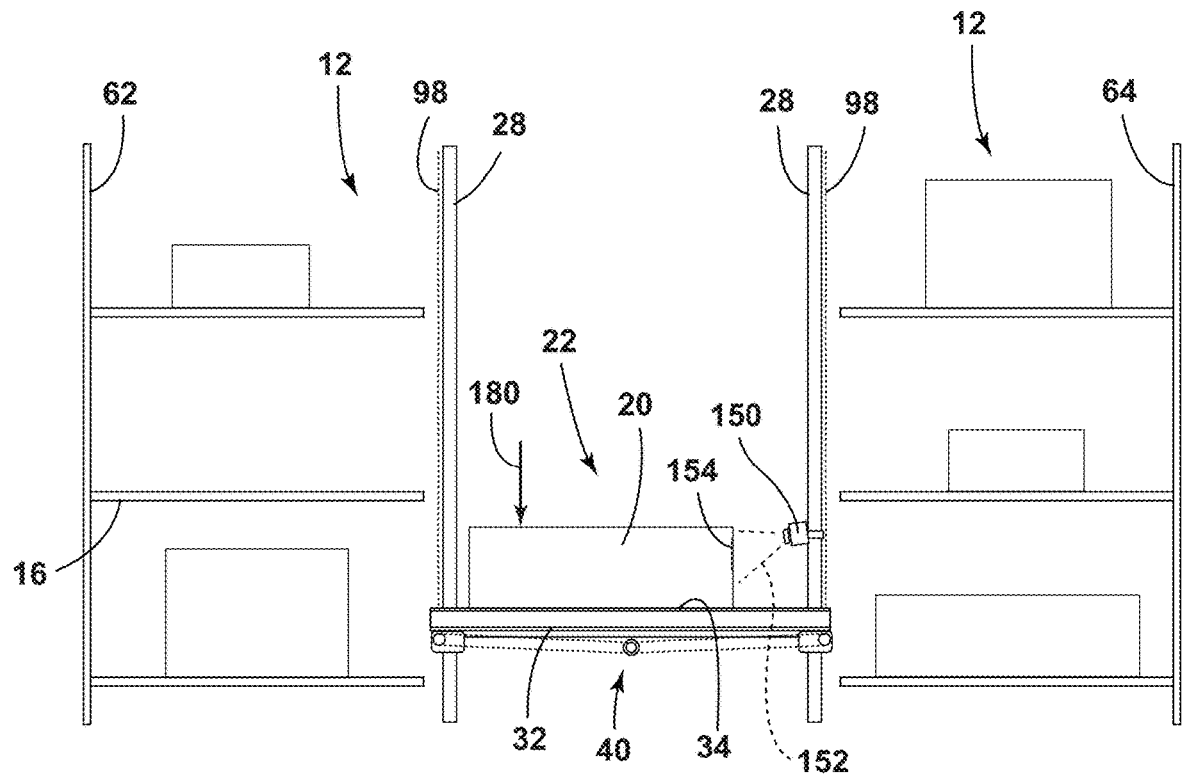
FIG. 11 is a schematic view of the lift assembly of FIG. 10 in the lowered position with the delivery item.
Figure 12:
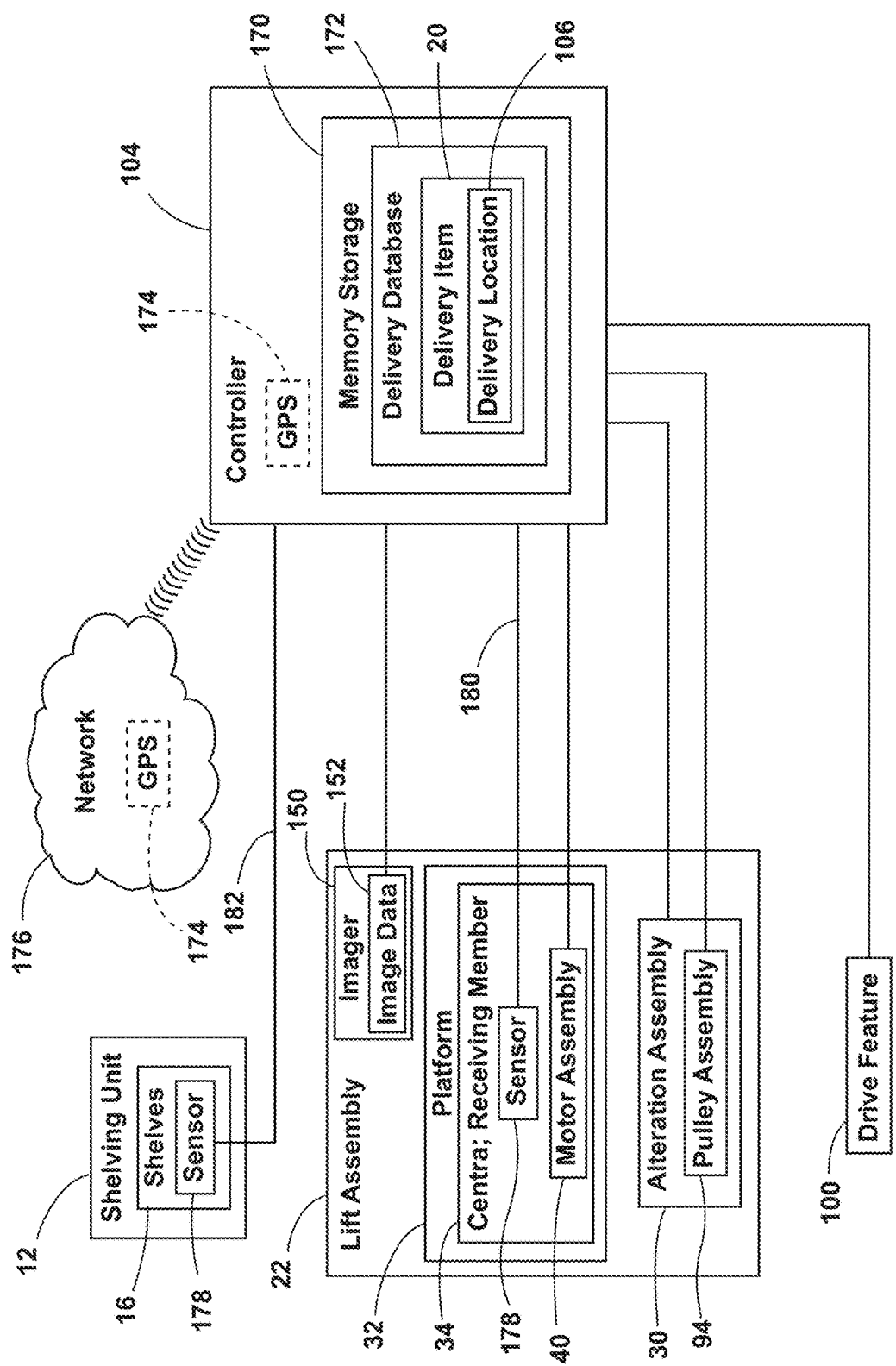
FIG. 12 is a schematic block diagram of the lift assembly of the present disclosure.
Figure 13:
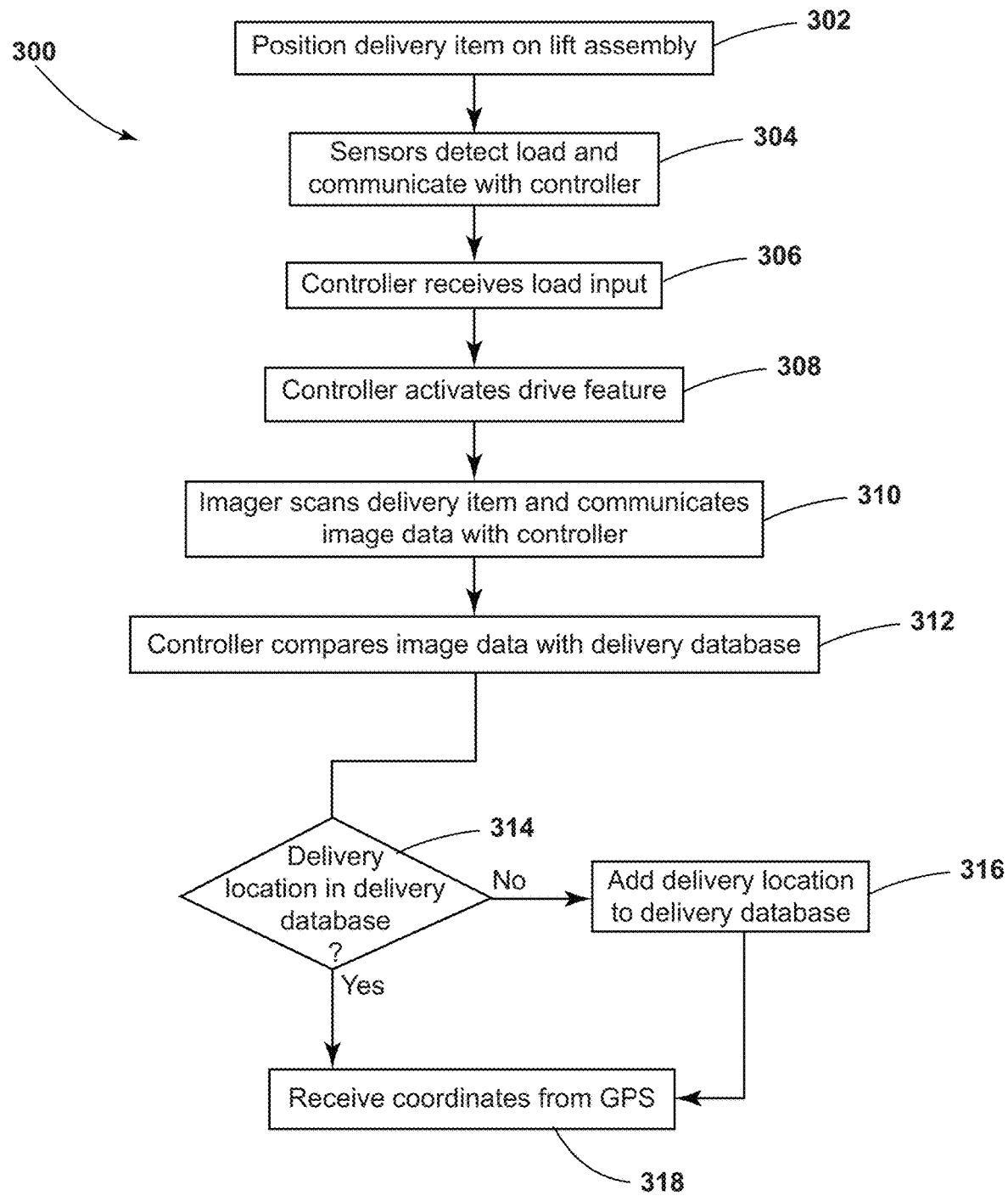
FIG. 13 is a flow diagram for a method of operating a lift assembly of the present disclosure.
Figure 14:
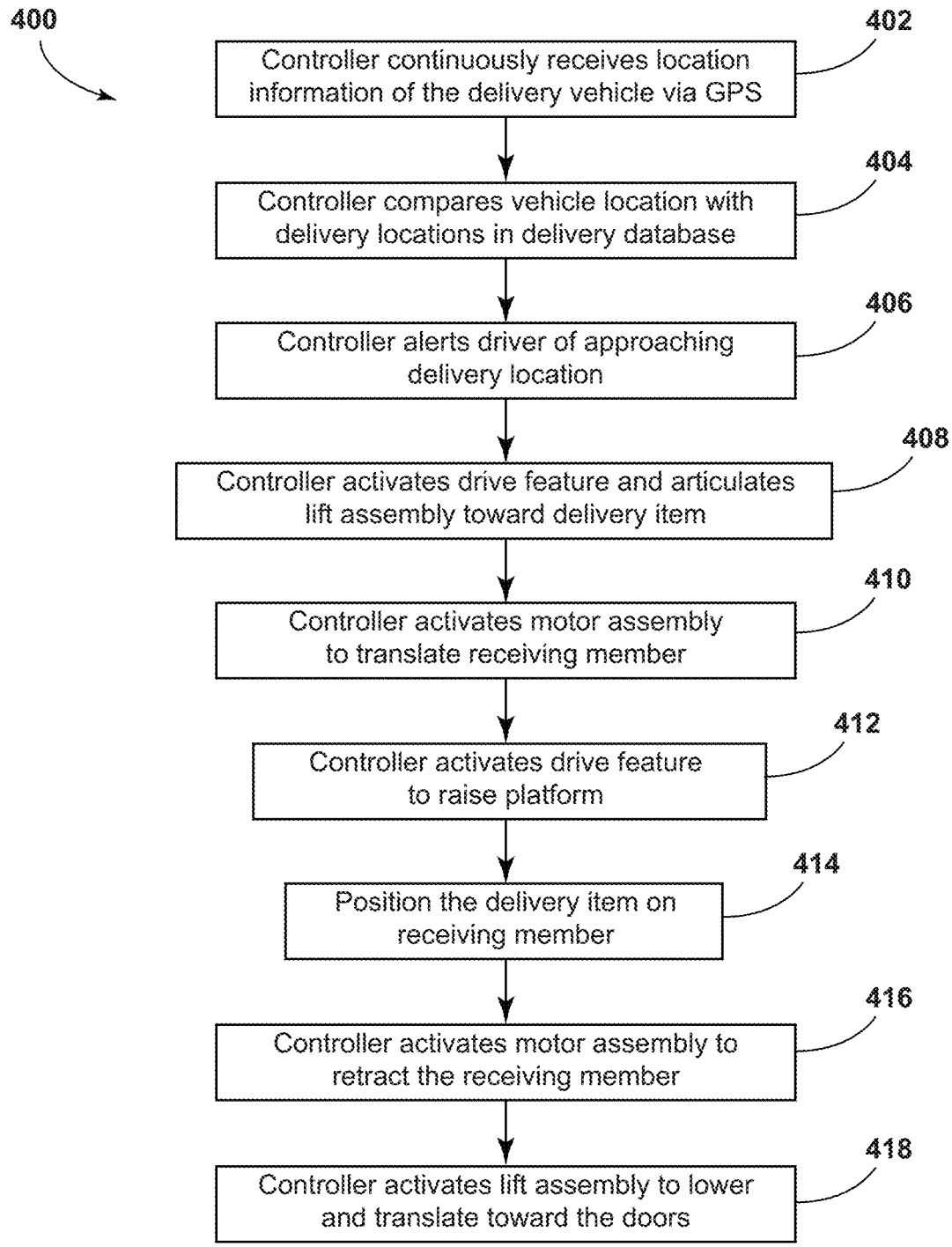
FIG. 14 is a flow diagram for a method of operating a lift assembly of the present disclosure.

As illustrated in FIG. 3, the pulley assembly 94 includes at least one pulley 96 and cables 98. It is generally contemplated that the pulley 96 is disposed within the housing 92 and that the cables 98 extend along the vertical guides 28. The cables 98 are operably coupled to the platform 32 to vertically translate the platform 32 relative to the shelving units 12. It is also contemplated that the cables 98 may extend laterally from the housing 92 along each of the upper and lower rails 24, 26. The cables 98 of the pulley assembly 94 can be coupled to a drive feature 100 to articulate the lift assembly 22 along the upper and lower rails 24, 26. The alteration assembly 30, including the pulley assembly 94, is operably coupled to both the upper and lower rails 24, 26, such that the cables 98 of the pulley assembly 94 extend laterally along each of the upper and lower rails 24, 26.

With further reference to FIGS. 1-4, the drive feature 100 is operably coupled to the alteration assembly 30 to horizontally and vertically translate the lift assembly 22. For example, the drive feature 100 is operably coupled to the plurality of wheels 90 of the alteration assembly 30 and horizontally translates the platform 32 via the vertical guides 28. The plurality of wheels 90 may be alternatively configured as rollers, tracks, and/or other gliding features that may articulate along the upper and lower rails 24, 26 to translate the lift assembly 22 within the cargo space 14. The drive feature 100 can be disposed within the interior 52 of the delivery vehicle 10 and/or along the rails 24, 26 and is configured to articulate the lift assembly 22 by driving the alteration assembly 30. For example, the drive feature 100 can laterally pull the cables 98 of the pulley assembly 94, which articulate the pulleys 96 to raise the platform 32 to define a raised position. The drive feature 100 may controllably release the cables 98 to lower the platform 32 to define a lowered position. The functionality of the drive feature 100 in combination with the alteration assembly 30 is described in more detail below.

Referring to FIGS. 1-4 and 12 and as illustrated in FIG. 3, the cables 98 are operably coupled to the platform 32 proximate to the vertical guides 28. The cables 98 extend upward from the platform 32 and around the pulleys 96 within the housing 92 and are ultimately coupled to the drive feature 100. The alteration assembly 30 may include lateral cables 102 that extend along, at least, the lower rail 26 and are coupled to the wheels 90 of the alteration assembly 30. The lateral cables 102 are also operably coupled to the drive feature 100 and are configured to horizontally translate the lift assembly 22 within the cargo space 14. As will be described in more detail below, the drive feature 100 is communicatively coupled to a controller 104 (FIG. 12), which is configured to activate and deactivate the drive feature 100.

Based on an input received by the controller 104, the drive feature 100 may raise and/or lower the platform 32 via the cables 98, as generally described above. For example, the controller 104 may receive the input indicating a delivery location 106 that corresponds to the delivery item 20. The controller 104 may then activate the drive feature 100 to pull the cables 98 and raise the platform 32. The pulley assembly 94 may cooperate with the lift assembly 22 to raise the platform 32 proximate to one of the shelves 16 in order to retrieve the delivery item 20 from the shelf 16, as described further below.

Referring now to FIGS. 3-7 and 12, the lift assembly 22 may also be referred to as a package lift system and/or a package lift assembly. The lift assembly 22 generally includes the vertical guides 28 operably coupled to the platform 32. The platform 32 includes the receiving member 34, which is centrally disposed on an upper surface 110 of the platform 32. First and second side rails 112, 114 are disposed on the platform 32 proximate to the receiving member 34, and the receiving member 34 is operably coupled to the first and second side rails 112, 114. Specifically, the receiving member 34 has peripheral side walls 116 that correspond with and are selectively disposed within each of the first and second side rails 112, 114. The peripheral side walls 116 translate within the first and second side rails 112, 114 between the holding position 38 and the retrieval position 36 of the receiving member 34. The receiving member 34 also has a first end 118 and a second end 120, each configured to receive the rods 82 of the shelves 16.

As will be described in further detail below, the receiving member 34 is articulated via the motor assembly 40, such that either the first end 118 or the second end 120 of the receiving member 34 may extend past the platform 32. The motor assembly 40 is operably coupled to both the platform 32 and a bottom surface 122 of the receiving member 34. A top surface 124 of the receiving member 34 defines a plurality of grooves 126 that selectively receive the rods 82 of the shelves 16. Support ridges 128 separate and define each of the grooves 126 and are configured to support and receive the delivery item 20. The delivery item 20 may be disposed on the support ridges 128 and translated to the rods 82 of the shelf 16 and may also be retrieved from the shelf 16 via placement of the rods 82 within the grooves 126, as described below.

With further reference to FIGS. 3-7 and as mentioned above, the motor assembly 40 is illustrated as being coupled to the platform 32. The motor assembly 40 includes a belt and pulley assembly 130, a motor 132, a rack 134, a pinion 136, and a gearbox 138 operably coupled to the belt and pulley assembly 130. The rack 134 is operably coupled to the bottom surface 122 of the receiving member 34, and the pinion 136 is operably coupled to the rack 134 proximate to at least one of the first and second ends 118, 120 of the receiving member 34. The pinion 136 engages the rack 134 to translate the central receiving member 34 between the holding position 38 and the retrieval position 36. The motor assembly 40 and the alteration assembly 30 work in conjunction to retrieve the delivery item 20 from the shelving units 12 via the central receiving member 34, as will be described in more detail below.

It is generally contemplated that the belt and pulley assembly 130 of the motor assembly 40 is operably coupled to the pinion 136 and the gearbox 138 to articulate the central receiving member 34 between the retrieval position 36 and the holding position 38. For example, the motor 132 is coupled to the gearbox 138 and rotates the gearbox 138 during operation to translate a belt 140 as the pinions 136 articulate with the rack 134 to laterally translate the central receiving member 34. It is generally contemplated that the belt 140 has a saw-tooth configuration to articulate with the pinions 36. The motor 132 is configured to rotate the gearbox 138 in either lateral direction, such that the central receiving member 34 may extend toward the first side 74 and/or the second side 76 of the cargo space 14. Stated differently, the central receiving member 34 can be translated toward the shelving unit 12 on either the first side 74 of the cargo space 14 and/or toward the second side 76 of the cargo space 14.

Referring to FIGS. 5-10 and as described further below, the lift assembly 22 may include an imager 150 configured to detect image data 152 in the form of a label 154 on the delivery item 20. The imager 150 detects the label 154 and communicates the received image data 152 with the controller 104. The label 154 typically contains delivery information, including, but not limited to, the delivery location 106 of the delivery item 20. The imager 150 may detect the delivery location 106 as the delivery location 106 may appear on the label 154. Additionally or alternatively, the label 154 may include a barcode or other coded image in which the delivery location 106 is embedded, which may be detected by the imager 150. The controller 104 may utilize the detected label 154 to articulate the lift assembly 22 to retrieve the delivery item 20 when the delivery vehicle 10 has arrived at the corresponding delivery location 106.

Referring now to FIGS. 1-12, the controller 104 is configured with a memory storage 170 in which a delivery database 172 may be stored. The delivery database 172 is configured with the delivery locations 106 for the delivery items 20. Although mentioned above as a single delivery location 106 and a single delivery item 20, it is also contemplated that the delivery vehicle 10 may include a plurality of delivery items 20 to be delivered to a plurality of delivery locations 106. The delivery database 172 includes the plurality of delivery locations 106, and the controller 104 is communicatively coupled to a global positioning system (GPS) 174 to determine the relative location of the delivery vehicle 10. Additionally or alternatively, the GPS 174 may be configured as part of the controller 104.

The controller 104 may communicate with the lift assembly 22 and the drive feature 100 to translate the imager 150, proximate to the new delivery item 20, in order to detect the label 154 and collect the image data 152. Once collected, the controller 104 can update the delivery database 172 with the delivery location 106. As indicated by the label 154, it is generally contemplated that the controller 104 is communicatively coupled to a network 176 and may receive and exchange information via the network 176. The controller 104 may be communicatively coupled to the GPS 174 via the network 176 to receive location information of the delivery vehicle 10 relative to the delivery database 172. The controller 104 may store the information received from the GPS 174 within the memory storage 170 and/or the controller 104 may repeatedly receive updated information from the GPS 174 via the network 176.

With further reference to FIGS. 1-14, it is generally contemplated that the delivery database 172 may be manually and/or automatically updated. For example, the driver may input delivery information associated with the delivery item 20, and corresponding to the label 154, which includes the delivery location 106 for the delivery item 20. Additionally or alternatively, the imager 150 of the lift assembly 22 may detect the label 154 of a newly positioned delivery item 20 within the cargo space 14, and the image data 152 received by the imager 150 may be communicated with the controller 104 to update the delivery database 172 within the memory storage 170 automatically, as generally mentioned above.

The shelves 16 may be configured with sensors 178 that may detect placement of the delivery item 20 on the shelf 16. The sensors 178 may communicate with the controller 104 to indicate the positioning of a new delivery item 20 on the shelf 16. The sensors 178 may also be disposed on the central receiving member 34 to detect the retrieval of the delivery item 20, described below. The sensors 178 are configured to detect a load 180 of the delivery item 20 on either or both of the shelves 16 and the central receiving member 34. The detected load 180 is communicated to the controller 104 via a load input 182 from the sensor 178.

Referring still to FIGS. 1-14, a method 300 for operating the lift assembly 22 includes the following steps. The delivery item 20 is positioned on the lift assembly 22 (step 302), and the sensors 178 on the lift assembly 22 communicate with the controller 104 (step 304). The controller 104 receives the load input 182 from the sensors 178 (step 306), indicating the placement of the delivery item 20 on the central receiving member 34 of the lift assembly 22. The controller 104 activates the drive feature 100 in response to receiving the load input 182 from the sensors 178 (step 308) indicating the placement of the delivery item 20 on the central receiving member 34. The delivery item 20 is positioned on the shelf 16 and/or within the separate storage compartment 80. The storage compartments 80 may be separated by the delivery locations 106, such that delivery items 20 that have a similar delivery location 106 may be grouped together.

The imager 150 scans the delivery item 20 to detect the label 154 and communicates the gathered image data 152 to the controller 104 (step 310). The image data 152 received by the controller 104 can be compared with the delivery database 172 stored in the memory storage 170 (step 312). If the controller 104 identifies the delivery item 20 within the delivery database 172, then the controller 104 may communicate with the GPS 174 to confirm the delivery location 106 of the delivery item 20 (decision step 314). If the controller 104 does not identify the delivery item 20 in the delivery database 172, then the controller 104 will add the delivery item 20 to the delivery database 172 (decision step 316). The controller 104 utilizes the image data 152 received from the imager 150 and as set forth above on the label 154 to input the delivery location 106 into the delivery database 172. Typically, the image data 152 received for the controller 104 includes the delivery location 106 of the delivery item 20, as mentioned above. The controller 104 can add the delivery location 106 to the delivery database 172 for the respective delivery item 20 (decision step 316) if the delivery location 106 is not listed in the delivery database 172. The controller 104 communicates with the GPS 174 to receive coordinates of the delivery location 106 (step 318). The coordinates are sent from the GPS 174 to the controller 104 via the network 176.

Referring still to FIGS. 1-14, a method 400 of operating the lift assembly 22 includes the following steps in conjunction with the steps outlined in the method 300. While the delivery vehicle 10 is en route to deliver the delivery items 20, the controller 104 continuously receives location information of the delivery vehicle 10 from the GPS 174 via the network 176 (step 402). The controller 104 compares the coordinates with the delivery database 172 (step 404) and may alert the driver of the delivery vehicle 10 via the user interface 72 when a delivery location 106 is approaching (step 406). As the delivery vehicle 10 approaches one of the delivery locations 106, the controller 104 activates the drive feature 100 to articulate the lift assembly 22 toward the delivery item 20 (step 408).

The controller 104 activates the motor assembly 40 of the lift assembly 22 to translate the central receiving member 34 toward the shelf 16 to retrieve the delivery item 20 (step 410). Stated differently, the controller 104 activates the motor assembly 40 to translate the central receiving member 34 from the holding position 38 to the retrieval position 36 (step 410). The controller 104 may then activate the drive feature 100 to raise the platform 32 (step 412), such that the plurality of rods 82 are disposed within the grooves 126 of the central receiving member 34. The activation of the drive feature 100 by the controller 104 to raise the platform 32 lifts the delivery item 20 off the plurality of rods 82 of the shelf 16 to position the delivery item 20 on the support ridges 128 of the central receiving member 34 (step 414). The controller 104 may then activate the motor assembly 40 to retract the central receiving member 34 from the recent retrieval position 36 back to the holding position 38 (step 416). The controller 104 once again activates the drive feature 100 to lower the lift assembly 22 and translate the lift assembly 22, along with the delivery item 20, toward the first and second doors 66, 68 of the delivery vehicle 10 (step 418).

The controller 104 may selectively and repeatedly activate steps 302-418 for other delivery items 20 with delivery locations 106 located nearby. The controller 104 may compare the delivery database 172 with the coordinates received from the GPS 174 via the network 176 to systematically retrieve the delivery items 20 via the lift assembly 22 for delivery locations 106 nearby. The controller 104 receives the load input 182 from the sensors 178, which indicates when the delivery item 20 has been removed from the lift assembly 22. Once the delivery item 20 is place and/or removed from the lift assembly 22, then another delivery item 20 may be retrieved by the lift assembly 22 and positioned on the central receiving member 34.

With further reference to FIGS. 1-14, the lift assembly 22 in combination with the controller 104 and the shelves 16 assists the delivery of delivery items 20 by automatically selecting the delivery item 20 to be delivered based on the upcoming delivery location 106. The lift assembly 22 in particular advantageously removes the delivery item 20 from the shelf 16, such that the driver or other delivery method may open the doors 66, 68 to the cargo space 14 and remove the delivery item 20 from the lift assembly 22. More specifically, the combination of the central receiving member 34 to receive the rods 82 of the shelf 16 and the pulley assembly 94 to lift the platform 32 advantageously and automatically removes the delivery item 20 from the shelf 16. The translation of the central receiving member 34 between the holding position 38 to the retrieval position 36 via the motor assembly 40 allows the lift assembly 22 to independently select and remove the delivery item 20. The controller 104 assists in this operation by controlling which delivery item 20 is to be selected by the lift assembly 22 based on the delivery location 106 of each delivery item 20 in the delivery database 172.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A delivery vehicle, comprising:
   shelving units disposed within a cargo space of said delivery vehicle, the shelving units including shelves and vertical supports;
   a delivery item disposed on at least one of the shelves; and
   a lift assembly operably coupled to the shelving units and configured to receive the delivery item, the lift assembly comprising:
   upper rails and lower rails each being operably coupled to said delivery vehicle;
   vertical guides operably coupled to the upper and lower rails;
   an alteration assembly operably coupled to each of the upper and lower rails and the vertical guides, the alteration assembly translates the vertical guides along the upper and lower rails;
   a platform operably coupled to the vertical guides and including a central receiving member, the central receiving member being operable between a retrieval position and a holding position; and
   a motor assembly operably coupled to the platform and each of the vertical guides;
   a controller communicatively coupled to the motor assembly, wherein the controller activates the motor assembly to translate the central receiving member between the retrieval position and the holding position;
   a drive feature communicatively coupled to the controller; and
   a pulley assembly operably coupled to the drive feature, wherein the drive feature translates the lift assembly between a raised position and a lowered position.

2. The delivery vehicle of claim 1, wherein the shelves include a plurality of rods, and wherein the plurality of rods are selectively disposed within the central receiving member in the retrieval position of the platform.

3. The delivery vehicle of claim 1, wherein the platform includes side rails operably coupled to the central receiving member, and wherein the central receiving member is configured to translate along the side rails between the retrieval position and the holding position.

4. The delivery vehicle of claim 1, wherein the controller translates the platform into the raised position when the central receiving member is in the retrieval position, and wherein the delivery item is disposed on the central receiving member in the retrieval position.

5. A package lift system for a vehicle, comprising:
   shelving units including shelves;
   upper and lower rails proximate to the shelving units;
   a lift assembly selectively engaged with the shelving units, the lift assembly comprising:
   an alteration assembly operably coupled to the upper and lower rails;
   vertical guides operably coupled to the alteration assembly;
   a platform operably coupled to the vertical guides and including a receiving member, the receiving member being operable between a retrieval position and a holding position; and
   a motor assembly operably coupled to the receiving member;
   a controller communicatively coupled to the motor assembly and the alteration assembly and translates the receiving member between the retrieval position and the holding position, the controller including a global positioning system; and a memory storage communicatively coupled to the controller and including a delivery database that includes coordinates from the global positioning system and a delivery location of a delivery item; and a drive feature operably coupled to the controller and the lift assembly, wherein the drive feature translates the lift assembly relative to the shelving units.

6. The package lift system of claim 5, wherein the receiving member includes sensors that detect a load on the receiving member, and wherein the controller is communicatively coupled to the sensors and activates the drive feature when the sensors detect the load on the receiving member.

7. The package lift system of claim 5, wherein the shelves include a plurality of rods and the receiving member defines a plurality of grooves, and wherein the plurality of rods are selectively disposed within the plurality of grooves in the retrieval position of the receiving member.

8. The package lift system of claim 5, further comprising:
an imager operably coupled to the lift assembly and communicatively coupled to the controller.

9. A package lift system for a vehicle, comprising:
shelving units including shelves;
upper and lower rails proximate to the shelving units;
a lift assembly selectively engaged with the shelving units, the lift assembly comprising:
an alteration assembly operably coupled to the upper and lower rails;
vertical guides operably coupled to the alteration assembly;
a platform operably couple to the vertical guides and including a receiving member, the receiving member being operable between a retrieval position and a holding position; and
a motor assembly operably coupled to the receiving member;
a controller communicatively coupled to the motor assembly and the alteration assembly and translates the receiving member between the retrieval position and the holding position, the controller including a global positioning system;
a memory storage communicatively coupled to the controller and including a delivery database that includes coordinates from the global positioning system and a delivery location of a delivery item; and
an imager operably coupled to the lift assembly and communicatively coupled to the controller, wherein the imager detects a label of the delivery item and the controller compares the detected label with the delivery location stored in the memory storage.

10. A package lift system for a vehicle, comprising:
shelving units including shelves;
upper and lower rails proximate to the shelving units;
a lift assembly selectively engaged with the shelving units, the lift assembly comprising:
an alteration assembly operably coupled to the upper and lower rails;
vertical guides operably coupled to the alteration assembly;
a platform operably coupled to the vertical guides and including a receiving member, the receiving member being operable between a retrieval position and a holding position; and
a motor assembly operably coupled to the receiving member;
a controller communicatively coupled to the motor assembly and the alteration assembly and translates the receiving member between the retrieval position and the holding position, the controller including a global positioning system; and
a memory storage communicatively coupled to the controller and including a delivery database that includes coordinates from the global positioning system and a delivery location of a delivery item, wherein the global positioning system of the delivery database is communicatively coupled to a network to receive location information of said vehicle, and wherein the controller activates the motor assembly of the lift assembly to retrieve the delivery item when the controller determines that the delivery location corresponds to the location information of said vehicle.

11. A package lift assembly for a delivery vehicle, comprising:
a plurality of rods that define at least one shelf;
upper and lower rails;
an alteration assembly operably coupled to the upper and lower rails;
vertical guides operably coupled to the alteration assembly;
a platform operably coupled to the vertical guides and including a central receiving member, wherein at least a portion of the plurality of rods are selectively disposed within the central receiving member; and
a motor assembly operably coupled to the central receiving member and the vertical guides, wherein the motor assembly and the alteration assembly cooperate to translate the platform along the vertical guides and translate the central receiving member between a retrieval position and a holding position, wherein the alternation assembly includes cables operably coupled to the platform, and wherein the cables translate the platform between a raised position and a lowered position.

12. The package lift assembly of claim 11, wherein the central receiving member defines grooves in which the plurality of rods are at least partially and selectively disposed.

13. The package lift assembly of claim 11, wherein the platform further includes side rails operably coupled to the central receiving member, and wherein the central receiving member translates along the side rails between the retrieval position and the holding position.

14. The package lift assembly of claim 11, further comprising:
a controller operably coupled to the alteration assembly and the motor assembly, wherein the controller includes delivery locations.

15. The package lift assembly of claim 14, wherein the controller activates the alteration assembly to position the platform proximate to the shelf, and wherein the controller activates the motor assembly to translate the central receiving member from the holding position to the retrieval position.

16. The package lift assembly of claim 15, wherein the controller activates the alteration assembly to raise the platform when the central receiving member is in the retrieval position.

* * * * *